(12) United States Patent
Kim et al.

(10) Patent No.: US 12,438,159 B2
(45) Date of Patent: Oct. 7, 2025

(54) CARBON-BASED CARRIER FOR FUEL CELL CATALYST, CATALYST COMPRISING SAME, MEMBRANE-ELECTRODE ASSEMBLY COMPRISING SAME, AND METHOD FOR PREPARING SAME

(71) Applicant: KOLON INDUSTRIES, INC., Seoul (KR)

(72) Inventors: Jung Ho Kim, Seoul (KR); Jun Young Kim, Seoul (KR); Kah-Young Song, Seoul (KR); Nakwon Kong, Seoul (KR); Jusung Lee, Seoul (KR); Kyoungsik Nam, Seoul (KR); Chanmi Park, Seoul (KR)

(73) Assignee: KOLON INDUSTRIES, INC, Seoul (KR)

( * ) Notice: Subject to any disclaimer, the term of this patent is extended or adjusted under 35 U.S.C. 154(b) by 562 days.

(21) Appl. No.: 17/778,938

(22) PCT Filed: Sep. 24, 2021

(86) PCT No.: PCT/KR2021/013006
§ 371 (c)(1),
(2) Date: May 23, 2022

(87) PCT Pub. No.: WO2022/085963
PCT Pub. Date: Apr. 28, 2022

(65) Prior Publication Data
US 2022/0416259 A1 Dec. 29, 2022

(30) Foreign Application Priority Data
Oct. 21, 2020 (KR) .................. 10-2020-0136421

(51) Int. Cl.
*H01M 4/92* (2006.01)
*H01M 8/10* (2016.01)
(Continued)

(52) U.S. Cl.
CPC ......... *H01M 4/926* (2013.01); *H01M 8/1004* (2013.01); *H01M 8/109* (2013.01); *H01M 2008/1095* (2013.01)

(58) Field of Classification Search
CPC .... H01M 4/926; H01M 8/1004; H01M 8/109; H01M 2008/1095; H01M 4/88; H01M 4/9083; Y02E 60/50; Y02P 70/50
See application file for complete search history.

(56) References Cited

U.S. PATENT DOCUMENTS 8,716,167 B2 5/2014 Shishikura
10,403,900 B2 9/2019 Kato
(Continued)

FOREIGN PATENT DOCUMENTS

CN 101304945 A 11/2008
CN 102125865 A 7/2011
(Continued)

OTHER PUBLICATIONS

Xu et al., Mesoporous carbon with uniquely combined electrochemical and mass transport characteristics for polymer electrolyte membrane fuel cells, 2013, RSC Advances, 3, 16-24 (Year: 2013).*
(Continued)

*Primary Examiner* — Daniel S Gatewood
(74) *Attorney, Agent, or Firm* — Harvest IP Law, LLP

(57) ABSTRACT

Disclosed are a carbon-based carrier that is capable of increasing catalyst activity as much as that of a porous type while having excellent durability unique to that of a solid type, a catalyst comprising same, a membrane-electrode assembly comprising same, and a method for preparing same. The carbon-based carrier for a fuel cell catalyst of the present invention is a solid-type carrier, and has an outer surface area of 100-450 m²/g, a mesopore volume of 0.25-0.65 cm³/g, and a micropore volume of 0.01-0.05 cm³/g.

5 Claims, 3 Drawing Sheets

(51) Int. Cl.
  *H01M 8/1004*    (2016.01)
  *H01M 8/1086*    (2016.01)

(56) References Cited

U.S. PATENT DOCUMENTS

| | | | |
|---|---|---|---|
| 2009/0208780 A1* | 8/2009 | Sun | B82Y 30/00 |
| | | | 502/180 |
| 2012/0028169 A1 | 2/2012 | Roh | |
| 2020/0055026 A1 | 2/2020 | Iijima | |

FOREIGN PATENT DOCUMENTS

| | | |
|---|---|---|
| CN | 102343263 B | 8/2015 |
| CN | 105073260 A | 11/2015 |
| JP | 2013-209504 A | 10/2013 |
| JP | 2015042614 A | 3/2015 |
| JP | 6097015 B2 | 3/2017 |
| JP | 2017524634 A | 8/2017 |
| JP | 2018012627 A | 1/2018 |
| JP | 2021535064 A | 12/2021 |
| KR | 1020060092741 A | 8/2006 |
| KR | 100708642 B1 | 4/2007 |
| TW | 201117459 A | 5/2011 |
| WO | 2016039268 A1 | 3/2016 |
| WO | 2018182048 A1 | 10/2018 |

OTHER PUBLICATIONS

Janus et al., On mechanism of formation of SBA-15/furfuryl alcohol-derivedmesoporous carbon replicas and its relationship with catalytic activity in oxidative dehydrogenation of ethylbenzene, 2020, Microporous and Mesoporous Materials, 299, 110118 (Year: 2020).*
Ramaswamy et al., Carbon Support Microstructure Impact on High Current Density Transport Resistances in PEMFC Cathode, 2020, J. Electrochem. Soc., 167, 064515 (Year: 2020).*
The office action dated Aug. 23, 2023 related to the corresponding Korean Patent application.
Mesoporous carbon with uniquely combined electrochemical and mass transport characteristics for polymer electrolyte membrane fuel cells, J. B. Xu et al.
Microporous and Mesoporous Materials (2020.02.22).
Chemistry—A European Journal (2019).
The office action dated Jun. 28, 2023 related to the corresponding Japanese Patent application.
Ramaswamy et al., Journal of the Electrochemical Society 167(6) (2020), 64515.
The office action dated Mar. 11, 2025 related to the corresponding European Patent application.
Office Action from Chinese Patent Office, dated Mar. 6, 2025.

* cited by examiner (a)            (b)

CARBON-BASED CARRIER FOR FUEL CELL CATALYST, CATALYST COMPRISING SAME, MEMBRANE-ELECTRODE ASSEMBLY COMPRISING SAME, AND METHOD FOR PREPARING SAME

CROSS REFERENCE TO RELATED APPLICATIONS

This application is a National Stage of International Application No. PCT/KR2021/013006 filed Sep. 24, 2021, claiming priority based on Korean Patent Application No. 10-2020-0136421 filed Oct. 21, 2020, the disclosures of which are incorporated herein by reference in their entireties.

TECHNICAL FIELD

The present disclosure relates to a carbon-based support for fuel cell catalysts, a catalyst including the same, a membrane-electrode assembly including the same, and a method for manufacturing the same. More particularly, the present disclosure relates to a carbon-based support capable of improving catalytic activity as much as a porous type support while having excellent durability peculiar to a solid-type support, a catalyst including the same, a membrane-electrode assembly including the same, and a method for manufacturing the same.

BACKGROUND ART

A polymer electrolyte membrane fuel cell (PEMFC), which generates electricity using a stacked structure of unit cells, each including a membrane-electrode assembly (MEA) and a separator (also referred to as a "bipolar plate"), is drawing attention as a next-generation energy source capable of replacing fossil fuels due to the high energy efficiency and environmental friendliness thereof.

A membrane-electrode assembly generally includes an anode (also referred to as a "fuel electrode"), a cathode (also referred to as an "air electrode"), and a polymer electrolyte membrane interposed therebetween.

When fuel such as hydrogen gas is supplied to an anode, the hydrogen at the anode is oxidized to produce a proton ($H^+$) and an electron ($e^-$). The produced proton is transferred to the cathode through the polymer electrolyte membrane (PEM), whereas the produced electron is transferred to the cathode through an external circuit. Oxygen supplied to the cathode is bonded to the proton and the electron and is thus reduced, thereby producing water.

In an attempt to increase the active surface area of a catalyst used to form an electrode of a membrane-electrode assembly, a catalyst in which catalytic metal particles are dispersed on the surface of a carbon-based support having electrical conductivity has been developed.

Such a carbon-based support may be classified into a solid-type support (e.g., acetylene black) and a porous-type support (e.g., furnace black).

Compared to the porous-type support, the solid-type support has excellent durability but relatively low specific surface area. The low specific surface area of the support limits the number of catalytic metal particles capable of being dispersed thereon, thus imposing a limitation on increasing the active surface area of the catalyst.

In an attempt to overcome this limitation, research has been conducted to increase the specific surface area of the solid-type carbon-based support. For example, as a method for increasing the specific surface area of a solid-type carbon-based support, Korean Patent Laid-Open Publication No. 10-2012-0021408 (hereinafter, referred to as "prior art") discloses thermally treating a support in a water vapor atmosphere. However, a catalyst having a satisfactory active surface area could not be prepared using the support thermally treated by this method.

As a result of continual research to elucidate the causes of the technical limitations of the prior art, it was found that the thermal treatment proposed in the prior art is capable of remarkably increasing the surface area and volume of both micropores and mesopores of the support, but is incapable of selectively increasing the surface area and volume of only the mesopores. Here, the term "mesopore" means a pore having a pore diameter of 2 to 50 nm, and the term "micropore" means a pore having a pore diameter of less than 2 nm.

However, in general, the catalytic metal particles which get inside the mesopores when dispersed on a support can make some contribution to catalytic activity, whereas the catalytic metal particles which get inside the micropores make almost no or very little contribution to the catalytic activity. Also, mesopores can better improve the mass transfer capacity of the catalyst, compared to micropores. For this reason, a solid-type carbon-based support that has been thermally treated according to the prior art (i.e. having more micropores than mesopores) cannot provide a catalyst with sufficient active surface area and improved mass transfer capacity.

Therefore, it is most important to find the conditions for thermal treatment of a solid-type carbon-based support, which are capable of selectively increasing only the number of mesopores rather than micropores.

DISCLOSURE

Technical Problem

Therefore, the present disclosure relates to a carbon-based support for fuel cell catalysts capable of preventing the problems caused by limitations and disadvantages of the related art as described above, a catalyst including the same, a membrane-electrode assembly including the same, and a method for manufacturing the same.

It is one aspect of the present disclosure to provide a carbon-based support for fuel cell catalysts that is, while having excellent durability peculiar to a solid-type support, capable of increasing catalytic activity as much as a porous-type support due to its mesopores of increased surface area and volume.

It is another aspect of the present disclosure to provide a catalyst for fuel cells that has excellent durability as well as high catalytic activity attributable to the improved dispersibility of catalytic metal particles due to the increased mesopores of the support.

It is another aspect of the present disclosure to provide a membrane-electrode assembly having excellent performance as well as superior durability.

It is another aspect of the present disclosure to provide a method of producing a carbon-based support for fuel cell catalysts that is, while having excellent durability peculiar to a solid-type support, capable of increasing catalytic activity as much as a porous-type support due to its mesopores of increased surface area and volume.

In addition to the aspects of the present disclosure described above, other features and advantages of the present disclosure will be described in the following detailed description, as will be clearly understood by those skilled in the art to which the present disclosure pertains.

Technical Solution

In accordance with the present disclosure, the above and other objects can be accomplished by the provision of a carbon-based support for fuel cell catalysts, wherein the carbon-based support is a solid-type support and has an external surface area of 100 to 450 m$^2$/g, a mesopore volume of 0.25 to 0.65 cm$^3$/g, and a micropore volume of 0.01 to 0.05 cm$^3$/g. Each of the external surface area, the mesopore volume, and the micropore volume is an arithmetic mean of measured values obtained from five randomly selected samples using a Brunauer-Emmett-Teller (BET) analyzer (Micromeritics, ASAP-2020).

The carbon-based support may have a BET surface area of 150 to 600 m$^2$/g, wherein the BET surface area is an arithmetic mean of measured values obtained from five randomly selected samples using the BET analyzer.

The carbon-based support may have a d-spacing value, calculated according to Bragg's law using a (002) peak obtained through XRD analysis, of 3.38 to 3.62 Å.

The carbon-based support may be an acetylene black support.

In accordance with another aspect of the present disclosure, there is provided a catalyst including the carbon-based support and catalytic metal particles dispersed on the carbon-based support.

In accordance with another aspect of the present disclosure, there is provided a membrane-electrode assembly including an anode, a cathode, and a polymer electrolyte membrane disposed between the anode and the cathode, wherein at least one of the anode and the cathode includes the catalyst.

In accordance with another aspect of the present disclosure, there is provided a method for manufacturing a carbon-based support, the method including preparing a solid-type carbon-based raw support, and thermally treating the raw support such that the support activated through the thermal treatment can satisfy the following Equations 1 to 3:

$$S_{EX\_AS} \geq S_{EX\_RS} \times 3 \qquad \text{[Equation 1]}$$

$$V_{MESO\_AS} \geq V_{MESO\_RS} \times 1.2 \qquad \text{[Equation 2]}$$

$$V_{MICRO\_AS} \leq V_{MICRO\_RS} \times 1.1 \qquad \text{[Equation 3]}$$

wherein $S_{EX\_AS}$ is an external surface area of the activated support, $S_{EX\_RS}$ is an external surface area of the raw support, $V_{MESO\_AS}$ is a mesopore volume of the activated support, $V_{MESO\_RS}$ is a mesopore volume of the raw support, $V_{MICRO\_AS}$ is a micropore volume of the activated support, and $V_{MICRO\_RS}$ is a micropore volume of the raw support.

Each of the external surface area, the mesopore volume, and the micropore volume is an arithmetic mean of measured values obtained from five randomly selected samples using a BET analyzer (Micromeritics, ASAP-2020).

The thermally treating may be performed in such a way that the activated support can further satisfy the following Equation 4:

$$S_{BET\_AS} \geq S_{BET\_RS} \times 2 \qquad \text{[Equation 4]}$$

wherein $S_{BET\_AS}$ is a BET surface area of the activated support and $S_{BET\_RS}$ is a BET surface area of the raw support.

The BET surface area ($S_{BET}$) is an arithmetic mean of measured values obtained from five randomly selected samples using the BET analyzer.

The thermally treating may be performed in such a way that the activated support can further satisfy the following Equations 5 and 6:

$$DS_{AS} \leq DS_{RS} \times 1.1 \qquad \text{[Equation 5]}$$

$$I_{AS} \geq I_{RS} \times 0.5 \qquad \text{[Equation 6]}$$

wherein $DS_{AS}$ is a d-spacing value calculated according to Bragg's law using a (002) peak obtained through XRD analysis of the activated support, $DS_{RS}$ is a d-spacing value calculated according to Bragg's law using a (002) peak obtained through XRD analysis of the raw support, $I_{AS}$ is an intensity of the (002) peak obtained through XRD analysis of the activated support, and $I_{RS}$ is an intensity of the (002) peak obtained through XRD analysis of the raw support.

The method may further include performing thermogravimetric analysis of the raw support before the thermally treating, and determining a first temperature, at which a weight loss of 20 wt % occurs, based on a result of the thermogravimetric analysis, wherein the thermally treating is performed in an air at a second temperature that satisfies the following Equation 7:

$$T_1 - 40^\circ \text{ C.} \leq T_2 \leq T_1 + 40^\circ \text{ C.} \qquad \text{[Equation 7]}$$

wherein $T_1$ is the first temperature and $T_2$ is the second temperature.

The raw support may include acetylene black.

The general description of the present disclosure is provided only for illustration of the present disclosure and does not limit the scope of the present disclosure.

Advantageous Effects

The present disclosure provides a carbon-based support capable of increasing catalytic activity as much as a porous-type support while exhibiting excellent durability peculiar to a solid-type support, by thermally treating a solid-type carbon-based support under specific conditions enabling the surface area and volume of mesopores, which can make a significant contribution to the increase in catalytic activity, to increase more than the surface area and volume of micropores.

According to the present disclosure, a catalyst for fuel cells having excellent durability as well as superior catalytic activity can also be provided.

The present disclosure can also provide a membrane-electrode assembly having excellent performance as well as superior durability.

DESCRIPTION OF DRAWINGS

The accompanying drawings, which are provided for better understanding of the present disclosure and constitute a part of the present specification, are given to exemplify the embodiments of the present disclosure and, together with the following detailed description, explain the principles and features of the present disclosure, in which.

MODE FOR INVENTION

Figure 1:
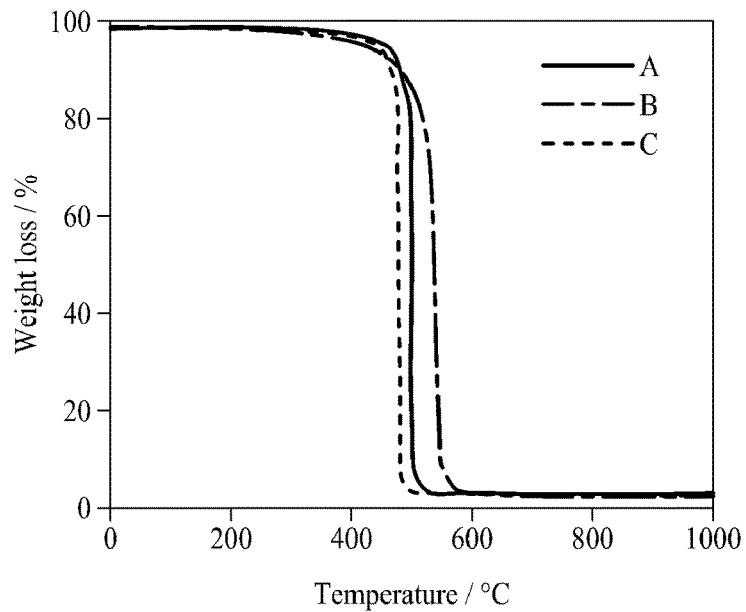
FIG. 1 is a graph illustrating the results of thermogravimetric analysis (TGA) of three types of raw acetylene black supports.

Hereinafter, embodiments of the present disclosure will be described in detail with reference to the accompanying drawings. However, the following embodiments are illustratively provided merely for clear understanding of the present disclosure, and do not limit the scope of the present disclosure.

The carbon-based support for fuel cells of the present disclosure is basically a solid-type support. According to an embodiment of the present disclosure, the solid-type carbon-based support may have any one shape selected from the group consisting of a sphere shape, a polyhedral shape, and an egg shape.

As described above, a solid-type support such as acetylene black has excellent durability, but has a low specific surface area, compared to a porous-type support such as furnace black.

As used herein, the term "solid-type support" is defined as a support having an external surface area of 450 m²/g or less and a micropore volume of 0.05 cm³/g or less, wherein the external surface area and the micropore volume are measured through a BET measurement method, and the term "porous-type support" is defined as a support having an external surface area higher than 450 m²/g and a micropore volume higher than 0.05 cm³/g, wherein the external surface area and the micropore volume are measured through a BET measurement method.

The present disclosure provides a carbon-based support that is capable of increasing catalytic activity so as to be comparable to that of a porous-type support, while exhibiting excellent durability comparable to that of a solid-type support, by thermally treating a solid-type carbon-based support under specific conditions set to increase the surface area and volume of mesopores, which can make a significant contribution to the increase in catalytic activity, more than the surface area and volume of micropores (that is, to selectively and substantially increase the surface area and volume only of mesopores). As described above, "mesopore" means a pore having a pore diameter of 2 to 50 nm, and "micropore" means a pore having a pore diameter less than 2 nm.

Specifically, the method for manufacturing a carbon-based support of the present disclosure includes preparing a solid type carbon-based raw support (e.g., acetylene black) and thermally treating the raw support under specific conditions.

The specific conditions may be conditions that enable the support activated through the thermal treatment to satisfy the following Equations 1 to 3:

$$S_{EX\_AS} \geq S_{EX\_RS} \times 3 \qquad \text{[Equation 1]}$$

$$V_{MESO\_AS} \geq V_{MESO\_RS} \times 1.2 \qquad \text{[Equation 2]}$$

$$V_{MICRO\_AS} \leq V_{MICRO\_RS} \times 1.1 \qquad \text{[Equation 3]}$$

wherein $S_{EX\_AS}$ is the external surface area of the activated support, $S_{EX\_RS}$ is the external surface area of the raw support, $V_{MESO\_AS}$ is the mesopore volume of the activated support, $V_{MESO\_RS}$ is the mesopore volume of the raw support, $V_{MICRO\_AS}$ is the micropore volume of the activated support, and $V_{MICRO\_RS}$ is the micropore volume of the raw support.

That is, according to the manufacturing method of the present disclosure, the external surface area ($S_{EX}$) of the support, which is determined mostly by the mesopores, is increased by three times or more by the thermal treatment, the mesopore volume ($V_{MESO}$) of the support is increased by 1.2 times or more by the thermal treatment, and the micropore volume ($V_{MICRO}$) of the support is increased only by 1.1 times or less by the thermal treatment.

Specifically, the carbon-based support according to the present disclosure, which is thermally treated under the specific conditions described above, has an external surface area ($S_{EX\_AS}$) of 100 to 450 m²/g, a mesopore volume ($V_{MESO\_AS}$) of 0.25 to 0.65 cm³/g, and a micropore volume ($V_{MICRO\_AS}$) of 0.01 to 0.05 cm³/g.

The specific conditions may be conditions that enable the support activated through the thermal treatment to further satisfy the following Equation 4:

$$S_{BET\_AS} \geq S_{BET\_RS} \times 2 \qquad \text{[Equation 4]}$$

wherein $S_{BET\_AS}$ is the BET surface area of the activated support, and $S_{BET\_RS}$ is the BET surface area of the raw support.

That is, according to the manufacturing method according to an embodiment of the present disclosure, it is preferable that the increase in the BET surface area ($S_{BET}$) of the support due to the thermal treatment should be 2 times or more, and this increase should be less than the increase in the external surface area ($S_{EX}$).

For example, the carbon-based support according to an embodiment of the present disclosure thermally treated under the specific conditions may have a BET surface area ($S_{BET\_AS}$) of 150 to 600 m²/g.

In the present disclosure, each of the external surface area ($S_{EX}$), the mesopore volume ($V_{MESO}$), the BET surface area ($S_{BET}$), and the micropore volume ($V_{MICRO}$) is the arithmetic mean of the measured values of five randomly selected samples using a BET analyzer (Micromeritics, ASAP-2020). According to the BET analysis, the physical properties of the sample are measured based on the Brunauer-Emmett-Teller (BET) theory after a gas (generally, nitrogen) is adsorbed onto the sample.

The specific conditions may be conditions that enable the support activated through the thermal treatment to further satisfy the following Equations 5 and 6:

$$DS_{AS} \leq DS_{RS} \times 1.1 \qquad \text{[Equation 5]}$$

$$I_{AS} \geq I_{RS} \times 0.5 \qquad \text{[Equation 6]}$$

wherein $DS_{AS}$ is a d-spacing value calculated according to Bragg's law using the (002) peak obtained through XRD analysis of the activated support, $DS_{RS}$ is a d-spacing value calculated according to Bragg's law using the (002) peak obtained through XRD analysis of the raw support, $I_{AS}$ is the intensity of the (002) peak obtained through XRD analysis of the activated support, and $I_{RS}$ is the intensity of the (002) peak obtained through XRD analysis of the raw support.

For example, the XRD analysis may be performed using an XRD analyzer (XRD-7000) manufactured by Shimadzu under the following conditions.

X-ray source: Cu-Kα (wavelength=1.54056 Å)

Voltage: 40 kV

Current: 30 mA

That is, in the manufacturing method according to an embodiment of the present disclosure, it is preferable that the d-spacing value ($DS_{RS}$) of the raw support be 3.2997 to 4.2269 Å, and that the d-spacing value ($DS_{RS}$) be increased by only 10% at most. In addition, it is preferable that the (002) peak intensity ($I_{RS}$) of the raw support be decreased by 50% at most through the thermal treatment.

For example, the carbon-based support of the present disclosure, thermally treated under the specific conditions described above, may have a d-spacing value ($DS_{AS}$) of 3.38 to 3.62 Å when XRD analysis is performed under the above conditions.

In order to satisfy the thermal treatment condition(s) described above, first of all, the thermal treatment should be performed in the air.

As described above, when the thermal treatment is performed in a water vapor atmosphere, the surface area and volume of the micropores as well as the surface area and volume of the mesopores are rapidly increased. As described above, when the catalytic metal particles are dispersed on the support, the catalytic metal particles incorporated into the mesopores can make some contribution to catalytic activity, whereas the catalytic metal particles incorporated into the micropores can make almost no or very little contribution to catalytic activity. Therefore, the increase in the surface area and volume of the micropores offsets the increase in catalytic activity due to the increase in the surface area and volume of the mesopores. As a result, a catalyst having a satisfactory active surface area cannot be produced with a support thermally treated in a water vapor atmosphere.

Meanwhile, the thermal treatment in an inert gas atmosphere may cause a problem in that the effect of activating the pores of the support is unsatisfactory. Accordingly, a support subjected to thermal treatment in an inert gas atmosphere may also not have sufficient external surface area ($S_{EX}$) or mesopore volume ($V_{MESO}$).

The thermal treatment temperature is also one of the critical process factors in satisfying the above-described thermal treatment condition(s), and is a process factor that should be determined depending on the type or physical properties of the raw support.

Accordingly, the method of the present disclosure may further include determining the thermal treatment temperature based on the type and/or physical properties of the raw support before the thermal treatment. More specifically, the method of the present disclosure includes, before the thermal treatment, performing thermogravimetric analysis (TGA) on the raw support and determining a first temperature, at which a weight loss of 20% by weight occurs, based on the result of the thermogravimetric analysis. The thermal treatment of the present disclosure may be performed at a second temperature that satisfies the following Equation 7, based on the determined first temperature:

$$T_1-40° C. \leq T_2 \leq T_1+40° C.$$ [Equation 7]

wherein $T_1$ is the first temperature and $T_2$ is the second temperature.

As can be seen from FIG. 1, which is a graph illustrating the results of thermogravimetric analysis (TGA) of three kinds of raw acetylene black supports, a rapid weight loss is observed from the point at which a weight loss of 20 wt % occurs, and the first temperature ($T_1$), at which the weight loss of 20 wt % occurs, varies greatly depending on the type of the raw acetylene black support. That is, in the example of FIG. 1, the first temperature ($T_1$) of the type A raw acetylene black support is about 500° C., the first temperature ($T_1$) of the type B raw acetylene black support is about 519° C., and the first temperature ($T_1$) of the type C raw acetylene black support is about 477° C.

As described above, the second temperature ($T_2$), which is the thermal treatment temperature of the present disclosure, may be a temperature within the range of $T_1 \pm 40°$ C., and more specifically a temperature within the range of $T_1 \pm 20°$ C. When the second temperature ($T_2$), which is the thermal treatment temperature, is higher than $T_1+40°$ C., oxidation of carbon occurs, thus causing a rapid increase in the surface area and volume of mesopores as well as the surface area and volume of micropores. Meanwhile, when the second temperature ($T_2$), which is the thermal treatment temperature, is less than $T_1-40°$ C., the thermal treatment effect is unsatisfactory, and thus a sufficient increase in the surface area and volume of the mesopores cannot be expected.

According to an embodiment of the present disclosure, the thermal treatment may be performed at the second temperature $T_2$ for 0.5 to 8 hours.

The catalyst of the present disclosure can be obtained by dispersing the catalytic metal particles through a conventional method on the solid-type carbon-based support of the present disclosure obtained through the thermal treatment.

The catalytic metal particles may include platinum or a platinum-based alloy. The platinum-based alloy may be (i) a binary alloy such as Pt—Co, Pt—Pd, Pt—Mn, Pt—Sn, Pt—Mo, Pt—Cr, Pt—W, Pt—Ir, Pt—Ru, Pt—Ni, or Pt—Fe, (ii) a ternary alloy such as Pt—Ru—W, Pt—Ru—Ni, Pt—Ru—Mo, Pt—Ru—Ir, Pt—Co—Mn, Pt—Co—Ni, Pt—Co—Fe, Pt—Co—Ir, Pt—Co—S, Pt—Co—P, Pt—Fe—Ir, Pt—Fe—S, Pt—Fe—P, Pt—Au—Co, Pt—Au—Fe, Pt—Au—Ni, Pt—Ni—Ir, or Pt—Cr—Ir, or (iii) a quaternary alloy such as Pt—Ru—Rh—Ni, Pt—Ru—Sn—W or Pt—Ru—Ir—Ni, but is not limited thereto.

As described above, by thermally treating the solid-type raw carbon-based support under certain conditions such that the surface area and volume of the mesopores, which can significantly contribute to the increase in catalytic activity, increase more than the surface area and volume of the micropores, the carbon-based support of the present disclosure obtained through thermal treatment has excellent durability, which is an inherent characteristic of a solid-type support, and can increase catalytic activity so as to be as high as that of a porous-type support. Accordingly, the catalyst for a fuel cell of the present disclosure obtained by dispersing catalytic metal particles on the carbon-based support of the present disclosure may have high catalytic activity as well as excellent durability.

Hereinafter, a method of forming an electrode and a membrane-electrode assembly including the same using the mixed catalyst of the present disclosure will be described in detail.

First, the catalyst prepared according to the present disclosure is dispersed along with an ionomer in a dispersion medium to prepare an electrode slurry.

The ionomer dispersed in the dispersion medium along with the catalyst according to the present disclosure serves to transfer protons, and also serves as a binder for improving adhesion between the electrode and the polymer electrolyte membrane. The ionomer may be a fluorine-based ionomer or a hydrocarbon-based ionomer, and may have at least one ion-conducting group selected from the group consisting of a sulfonic group, a carboxyl group, a boronic group, a phosphoric group, an imide group, a sulfonimide group, a sulfonamide group, and a sulfonyl fluoride group.

For example, the ionomer may be a fluorine-based ionomer such as poly(persulfonyl fluoride acid) or poly(perfluorocarboxylic acid).

Alternatively, the ionomer may be a hydrocarbon-based ionomer such as sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, or sulfonated polyarylene ether sulfone ketone.

The dispersion medium may be water, a hydrophilic solvent, an organic solvent, or a mixture of two or more thereof.

The hydrophilic solvent may be a compound containing, as a main chain, a linear or branched saturated or unsaturated hydrocarbon having 1 to 12 carbon atoms, and having at least one functional group selected from the group consisting of alcohols, ketones, aldehydes, carbonates, carboxylates, carboxylic acid, ethers, and amides.

The organic solvent may be N-methylpyrrolidone (NMP), dimethylsulfoxide (DMSO), tetrahydrofuran (THF), dimethylacetamide (DMAc), or a mixture of two or more thereof, but is not limited thereto.

Subsequently, a substrate is coated with the electrode slurry, and then the coated electrode slurry is dried.

In an embodiment of the present disclosure, the electrode may be formed on the polymer electrolyte membrane through a decal transfer method.

In accordance with the decal transfer method, the substrate coated with the electrode slurry is a release film, and the method of forming an electrode according to the present disclosure further includes transferring the electrode formed on the release film by drying to the polymer electrolyte membrane and removing the release film.

Specifically, the electrode slurry is coated to have a predetermined shape and size on the release film using a mask film, and then the dispersion medium is removed from the electrode slurry through a subsequent drying process. Subsequently, the release film and the electrode are stacked on the polymer electrolyte membrane such that the electrode formed through the drying process contacts the polymer electrolyte membrane, and are then hot-pressed to transfer the electrode onto the polymer electrolyte membrane, after which the release film is removed.

When a membrane-electrode assembly is manufactured using a decal transfer method, generally, each of an anode and a cathode are formed on release films in the same manner as above, and the anode and the cathode are simultaneously transferred to one surface and the other surface of the polymer electrolyte membrane.

The polymer electrolyte membrane may be a single-membrane type formed of an ionomer, or a reinforced composite-membrane type including a porous support impregnated with an ionomer. The ionomer of the polymer electrolyte membrane and the ionomer of the electrode slurry are preferably the same kind of ionomer, but the present disclosure is not limited thereto, and different kinds of ionomers may be used in the manufacture of the polymer electrolyte membrane and the electrode.

In another embodiment of the present disclosure, the electrode may be formed on the polymer electrolyte membrane through a direct coating method.

In accordance with the direct coating method, the substrate coated with the electrode slurry is a polymer electrolyte membrane. For example, the polymer electrolyte membrane is coated with the electrode slurry in a predetermined shape and size using a mask film, and a drying process is performed to remove the dispersion medium from the electrode slurry. Subsequently, when the electrode is formed through the drying process, the mask film is removed.

When manufacturing a membrane-electrode assembly using a direct coating method, an anode and a cathode may be sequentially formed on one surface and the other surface of the polymer electrolyte membrane.

As described above, the membrane-electrode assembly (MEA) of the present disclosure can be manufactured by forming the anode and the cathode on one surface and the other surface, respectively, of the polymer electrolyte membrane using the electrode slurry, by means of a decal transfer method or a direct coating method.

For example, the membrane-electrode assembly (MEA) of the present disclosure includes an anode, a cathode, and a polymer electrolyte membrane therebetween, wherein at least one of the anode and the cathode may include the catalyst of the present disclosure.

Hereinafter, the present disclosure will be described in more detail with reference to specific examples. These examples are provided only for better understanding, and should not be construed as limiting the scope of the present disclosure.

Example 1

Thermogravimetric analysis (TGA) was performed on the raw acetylene black support, and it was found that the first temperature ($T_1$), at which a weight loss of 20 wt % occurred, was 500° C. Then, the second temperature ($T_2$), which is the thermal treatment temperature, was set to 500° C. within the range of $T_1 \pm 40°$ C., and the raw acetylene black support was thermally treated for 5 hours. Specifically, a boat containing the raw support was placed in a furnace. The temperature of the furnace was elevated to 500° C. at a rate of 5° C./min in an air atmosphere, and the raw support was thermally treated for 5 hours to obtain a solid-type activated acetylene black support.

Comparative Example 1

A solid-type activated acetylene black support was obtained in the same manner as in Example 1 except that the same kind of raw acetylene black support (i.e., $T_1$=500° C.) as in Example 1 was prepared, and the second temperature ($T_2$), which is the thermal treatment temperature, was set to 550° C.(=$T_1$+50° C.).

Comparative Example 2

A solid-type activated acetylene black support was obtained in the same manner as in Example 1 except that the same kind of raw acetylene black support (i.e., $T_1$=500° C.) as in Example 1 was prepared, but the second temperature ($T_2$), which is the thermal treatment temperature, was set to 450° C.(=$T_1$-50° C.).

Comparative Example 3

A solid-type activated acetylene black support was obtained in the same manner as in Example 1 except that the same kind of raw acetylene black support (i.e., $T_1$=500° C.) as in Example 1 was prepared, but the thermal treatment was performed in a water vapor atmosphere, rather than the air atmosphere.

BET Analysis

The physical properties i.e., BET surface area ($S_{BET}$), micropore surface area ($S_{MICRO}$), external surface area ($S_{EX}$), total pore volume ($V_T$), micropore volume ($V_{MICRO}$), and mesopore volume ($V_{MESO}$) of the raw acetylene black support and the activated acetylene black supports of Example 1 and Comparative Examples were measured using a BET analyzer (Micromeritics, ASAP-2020). Specifically, the physical properties of 5 samples randomly selected from each support were measured, the arithmetic mean of the measured sample values for each physical property was calculated, and the results are shown in Table 1 below.

XRD Analysis

Figure 2:
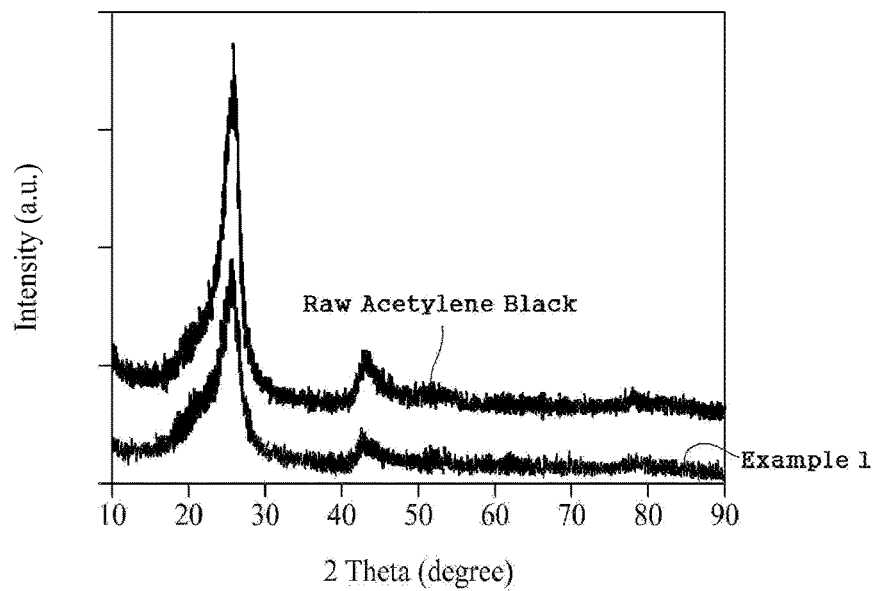
FIG. 2 is XRD graphs of the raw acetylene black supports and the activated acetylene black support of Example 1.

XRD analysis was performed on each of the raw acetylene black supports and the activated acetylene black supports of Example 1 and Comparative Examples using an XRD analyzer (Shimadzu, XRD-7000) [X-ray source: Cu-Kα (wavelength=1.54056 Å)]. The d-spacing values (DS) calculated according to Bragg's law using the (002) peak are shown in Table 1 below. In addition, XRD graphs of the raw acetylene black supports and the activated acetylene black support of Example 1 are shown in FIG. 2.

TABLE 1

|  | $S_{BET}$ (m²/g) | $S_{MICRO}$ (m²/g) | $S_{EX}$ (m²/g) | $V_{MICRO}$ (cm³/g) | $V_{MESO}$ (cm³/g) | $V_T$ (cm³/g) | DS (Å) |
|---|---|---|---|---|---|---|---|
| Raw support | 69.0 | 27.5 | 41.4 | 0.01 | 0.22 | 0.23 | 3.4782 |
| Ex. 1 | 166.7 | 31.7 | 134.9 | 0.01 | 0.27 | 0.28 | 3.4997 |
| Comp. Ex. 1 | 235.6 | 54.2 | 181.7 | 0.06 | 0.41 | 0.47 | 3.8704 |
| Comp. Ex. 2 | 72.4 | 28.7 | 42.5 | 0.01 | 0.24 | 0.25 | 3.4825 |
| Comp. Ex. 3 | 280.1 | 60.5 | 220.1 | 0.10 | 0.47 | 0.57 | 3.8621 |

As shown in Table 1, in Example 1, the external surface area ($S_{EX}$) and the mesopore volume ($V_{MESO}$) of mesopores were remarkably increased, but the micropore surface area ($S_{MICRO}$) and the micropore volume ($V_{MICRO}$) hardly increased (i.e., the surface area and volume of the mesopores significantly increased, but the surface area and volume of the micropores hardly increased). In contrast, in Comparative Examples 1 and 3, the external surface area ($S_{EX}$) and the mesopore volume ($V_{MESO}$) of mesopores were increased, but a great increase in the micropore surface area ($S_{MICRO}$) and the micropore volume ($V_{MICRO}$) was also observed (i.e., the surface area and volume of the micropores increased as high as the surface area and volume of the mesopores). As described above, when the catalytic metal particles are dispersed on the support, the catalytic metal particles incorporated into the mesopores can make some contribution to the catalytic activity, whereas the catalytic metal particles incorporated into the micropores make almost no or very little contribution to catalytic activity. In consideration thereof, the increase in the micropore surface area and volume offsets the increase in the catalytic activity due to the increase in the mesopore surface area and volume, and as a result, it is difficult to expect an increase in catalytic activity from thermal treatment of the support.

In addition, while the d-spacing values (DS) of the activated acetylene black supports of Example 1 and Comparative Example 2 were not greatly different from the d-spacing values (DS) of the raw acetylene black support [for example, in Example 1, the d-spacing value (DS) increased by only about 0.6% through heat treatment], the d-spacing values (DS) of the activated acetylene black supports of Comparative Examples 1 and 3 were much greater than the d-spacing value (DS) of the raw acetylene black support (that is, the d-spacing value (DS) is remarkably increased through thermal treatment). This remarkable increase in the d-spacing value (DS) (e.g., an increase greater than 10%) indicates a remarkable change in the crystal structure of carbon.

As can be seen from the XRD graph of FIG. 2, the (002) peak intensity (I) of Example 1 was 50% or more of the (002) peak intensity (I) of the raw acetylene black support [i.e., the decrease in the (002) peak intensity (I) due to activation was 50% or less].

Although not described in detail, the activated acetylene black supports respectively obtained by thermally treating the raw acetylene black support at temperatures within the range of $T_1$±40° C. (i.e., 460° C., 480° C., 520° C., and 540° C.) also showed the results similar to those for the activated acetylene black support of Example 1.

BET Isotherm and Pore Distribution Curve

Figure 3:
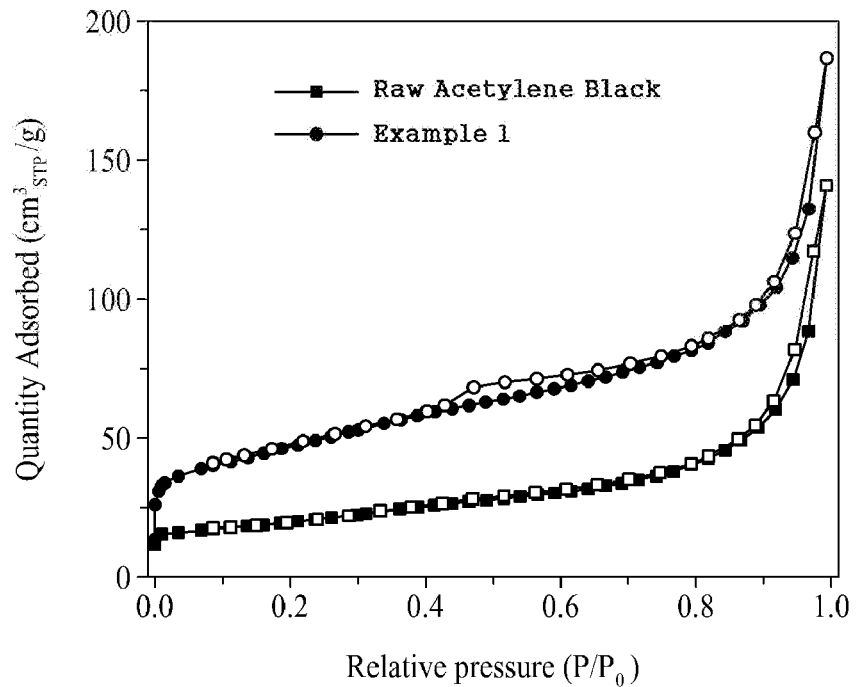
FIG. 3 is a graph illustrating the BET isotherm curves of each of the raw acetylene black supports and activated acetylene black support of Example 1.
Figure 4:
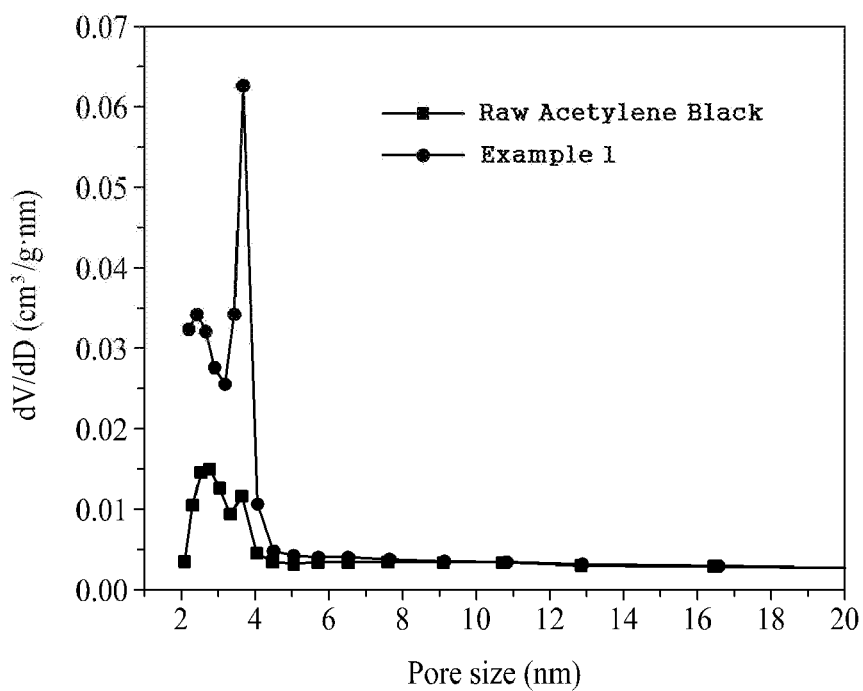
FIG. 4 is a graph illustrating the pore distribution curves of each of the raw acetylene black supports and the activated acetylene black support of Example 1; and (a) and (b) of FIG. 5 are transmission electron microscopy (TEM) and high-resolution transmission electron microscopy (HR-TEM) images illustrating the catalyst produced using the activated acetylene black support of Example 1.

BET isotherms and pore distribution curves of the raw acetylene black supports and the activated acetylene black support of Example 1 were obtained using a BET analyzer (Micromeritics, ASAP-2020), and are shown in FIGS. 3 and 4, respectively.

From the graph of FIG. 3, it can be seen that the Type II isothermal curve was changed to the type IV isothermal curve after the thermal treatment of Example 1, which means that the number of mesopores rather than that of micropores increased.

In addition, it can be seen from the graph of FIG. 4 that the surface area and volume of the mesopores were greatly increased through the thermal treatment of Example 1.

Figure 5:
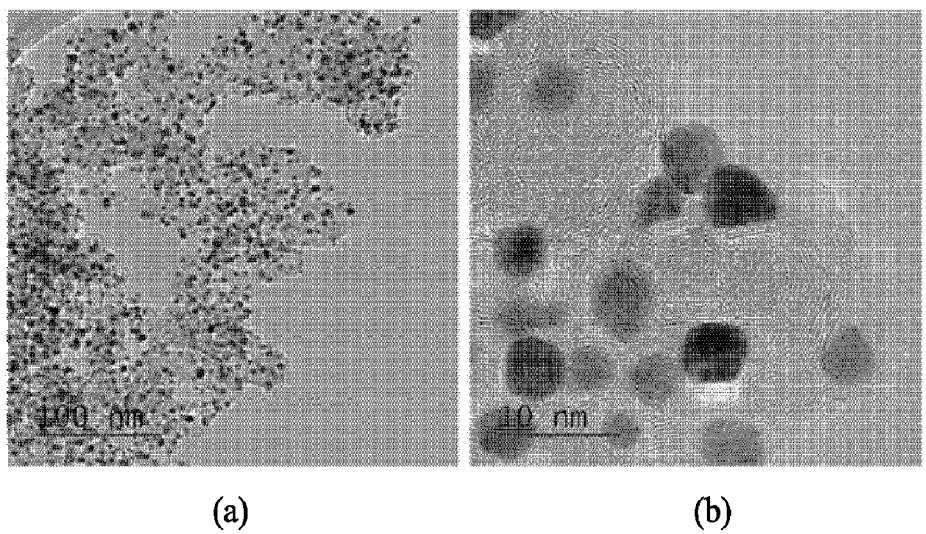

Transmission Electron Microscopy (TEM) Analysis of Catalysts (a) and (b) of FIG. 5 are a transmission electron microscope (TEM) image and a high-resolution-transmission electron microscope (HR-TEM) image of a catalyst obtained by dispersing catalytic metal particles on the activated acetylene black support of Example 1. As can be seen from the images of FIG. 5, the catalytic metal particles are uniformly distributed on the solid-type carbon-based support of the present disclosure.

The invention claimed is:
1. A carbon-based support for a fuel cell catalyst, wherein the carbon-based support is a solid-type support and has an external surface area of 100 to 450 m²/g, a BET surface area of 150 to 600 m²/g, a mesopore volume of 0.25 to 0.65 cm³/g, and a micropore volume of 0.01 to 0.05 cm³/g,
  wherein each of the external surface area, the BET surface area, the mesopore volume, and the micropore volume is an arithmetic mean of measured values obtained from five randomly selected samples using a Brunauer-Emmett-Teller (BET) analyzer (Micromeritics, ASAP-2020).

2. The carbon-based support according to claim 1, wherein the carbon-based support has a d-spacing value, calculated according to Bragg's law using a (002) peak obtained through XRD analysis, of 3.38 to 3.62 Å.

3. The carbon-based support according to claim 1, wherein the carbon-based support is an acetylene black support.

4. A catalyst comprising:
the carbon-based support according to claim 1; and
catalytic metal particles dispersed on the carbon-based support.

5. A membrane-electrode assembly comprising:
an anode;
a cathode; and
a polymer electrolyte membrane disposed between the anode and the cathode,
wherein at least one of the anode and the cathode comprises the catalyst according to claim 4.

\* \* \* \* \*